United States Patent Office 3,360,394
Patented Dec. 26, 1967

3,360,394
PROCESS FOR FORMING BREATHABLE POLYURETHANE COATING ON A TEXTILE FABRIC AND THE RESULTING PRODUCT
Thomas Franklin Griffin and Delbert Allen Davis, Kernersville, N.C., assignors to Burlington Industries, Inc., Greensboro, N.C., a corporation of Delaware
No Drawing. Filed Jan. 24, 1964, Ser. No. 339,881
12 Claims. (Cl. 117—63)

The present invention relates to the preparation of breathable coatings on textile fabrics containing natural and/or synthetic fibers. The resulting products are adapted for use where breathability, i.e. air or water vapor permeability, is important, as for example, in the case of rainwear.

Broadly speaking, the products of the invention are prepared by applying a polyurethane coating to at least one side of the fabric and then leaching the fabric in hot aqueous caustic alkali, preferably sodium hydroxide, followed by washing in water and, if desired, neutralizing and washing again, and then drying.

The degree of breathability may be controlled by the length of time the polyurethane-coated fabric is exposed to the caustic alkali bath. Usually, the length of this treatment will fall in the range of 5 to 9 minutes although times outside this range may be used depending on other operating conditions, e.g. the type and concentration of caustic alkali used, etc.

Advantageously, the treatment with caustic alkali is carried out with the caustic alkali at the boil. However, it is possible to use lower temperatures, for example, 88° or even lower.

The caustic alkali concentration may be varied over a relatively wide range, e.g. from 4 to 12% by weight of caustic alkali. At lower concentrations within the indicated range, longer treatment times and/or higher temperatures are usually necessary to obtain the same degree of breathability.

The water wash after leaching appears to be critical to give optimum results. Usually, therefore, it is important to water wash the leached product long enough to remove polyurethane components which may have hydrolyzed as a result of the caustic alkali treatment. A water wash of at least 15 minutes is usually sufficient for this purpose after which the fabric may be treated with acetic acid or the equivalent to neutralize any caustic remaining on the fabric followed by further washing, if desired, and drying.

Any of the conventional types of polyurethane coatings may be used herein. Thus, the polyurethane may be applied as such to the fabric or it may be formed in situ by applying the polyurethane-forming components to the fabric and allowing these components to react. For example, the desired polyurethane coating may be obtained by applying a two component system comprising an organic solvent solution of a polyester of polyether containing hydroxy groups and an organic polyisocyanate to the fabric followed by solvent removal. The desired urethane in this case is obtained by reaction between the hydroxy groups of the polyester or polyether and the isocyanate groups. Heat may be used to remove the solvent and effect the desired reaction. Atmospheric moisture or other conventional means may be used, if desired, to cure the coatings. Two component systems which are liquid without the use of organic solvents may also be used.

The two component system referred to above, typically that commercially available under the name "Impranil CHW" (Bayer), constitutes a preferred way of applying the polyurethane coating herein. The resulting coating breaks down quickly in the caustic leach to give well distributed pores in the finished product. However, in lieu of the two component system, "blocked" isocyanate systems may also be advantageously used to provide the polyurethane coating. As well known in the art, a system of this type utilizes an isocyanate which is blocked by means of a phenol, aromatic amine or the like. The blocking agent forms an adduct with the isocyanate which, on heating (e.g. to 150° C.), releases the isocyanate so that it can react with the polyester or polyether component or other hydroxy-containing material in the system. A typical blocked isocayanate system is available as "Unithane 200" (Thiokol).

The polyurethane coating may also be obtained by means of a pre-reacted polyurethane system. In this system, the components are all reacted ahead of time and a solvent solution of the reaction product is applied to the fabric followed by removal of the solvent and the caustic leach. Representative of this type of coating material is the product known as "Estane 5740X2" (Goodrich).

The polyester component in any of the various polyurethane systems which may be used is typically an anhydrous polyester made from a saturated glycol, for example, ethylene glycol, and an aliphatic dicarboxylic acid or anhydride thereof such as, adipic acid, using an excess of glycol over the acid so that the resulting polyester is substantially terminated with alcoholic hydroxyl groups. Such an amount of glycol is used to give a polyester having a hydroxy number in the range of about 25 to 115 and an acid number of less than about 6, usually less than 2. The polyesters may be substantially linear in type with melting points of 90° C. or lower and molecular weights within the range of 1000 to 5000 although polyesters with melting points outside these limits may also be used. Many useful polyesters are obtained by a condensation reaction of one or more saturated alkyl dibasic acids or acid anhydrides with one or more saturated glycols, e.g. poly(ethylenepropylene adipate) formed by esterifying a mixture of ethylene glycol and propylene glycol in a mol ratio of 70 to 30, respectively, with adipic acid. Other examples of polyesters are polyethylene adipate, polyethylene adipate (70)-phthalate (30), poly (diethylene glycol adipate), poly triethylene glycol adipate), etc.

As an alternative to the polyesters just described, there may be used one or more polyethers. The polyethers may be typified as anhydrous, chain-extended polyethers possessing ether linkages (—O—) separated by aliphatic hydrocarbon chains. The ether contains terminal alcoholic hydroxyl groups reactive with isocyanate groups. The polyethers may also be substantially linear in type with molecular weights within the range of 500 to 3000 and hydroxyl numbers of about 35 to 225. Examples of such polyethers are polyethylene glycol, poly (trimethylene glycol), poly (pentamethylene glycol), poly (2-ethyl 1,3-propylene glycol) and poly (2-methyl 1,5-amylene glycol). In general, polyethers having the ether linkages thereof separated by linear aliphatic hydrocarbon chains of from two to five carbon atoms can be employed.

As employed herein, the expression "linear" is intended to include bivalent aliphatic or aromatic radicals directly connecting the carbonyloxy groups of the polyester or oxygen atoms of the polyether, with or without non-functional lower alkyl side chains. In the case of polyethers, said non-functional lower alkyl side chains should be attached to a carbon atom other than the terminal carbon atoms of the bivalent radical.

Any of a wide variety of conventional organic diisocyanates may be employed. Such organic diisocyanates can be divided into the following sub-classes (a) alkylene, (b) arylene, (c) aralkylene, and (d) alkarylene diisocyanates. Examples of these subclasses are the alkylene diioscyanates such as 1,6-hexamethylene diisocyanate, 1,4-tetramethylene diisocyanate, 1,10-decamethylene diisocyanate, and including cycloalkylene diisocyanates such as 1,4-cyclohexylene diisocyanate and 4,4'-methylene-bis(cyclohexyl isocyanate); the arylene diisocyanates such as m-phenylene diisocyanate, p-phenylene diisocyanate, p,p'-biphenyl diisocyanate, 1,5-naphthalene diisocyanate, 4-chloro-1,3-phenylene diisocyanate, and 1,5-tetrahydronaphthalene diisocyanate; aralkylene diisocyanates such as metaxylylene diisocyanate; and alkarylene diisocyanates such as 2,4-toluene diisocyanate and p,p'-diphenylmethane diisocyanate. It is usually preferred to employ a molar excess of diisocyanate, over that amount which would be required to react with all of the alcoholic hydroxyl groups furnished by the polyester or polyether as the case may be although such excess is not essential.

Curing of the polyurethane is not necessary and will depend on the type of polyurethane used. Suitable curing agents which may be used, if needed, include aromatic diamines (p,p'-diaminodiphenyl methane or p-phenylene diamine), amino-phenols (p-aminophenol or m-aminophenol), aliphatic diamines (hexamethylene-diamine or tetramethylene diamine), amino-alcohols (ethanolamine or p-aminobenzyl alcohol) or water. Ditertiaryalkyl peroxides and dicumyl peroxide may also be employed as curing agents.

The polyurethane or polyurethane-forming composition is applied to the fabric in liquid form, usually but not necessarily as a solution in organic solvent. Organic solvents used to prepare the polyurethane coatings, e.g. acetone, should preferably be moisture-free although this will depend to some degree on the system involved. For example, the two component system will cure in the presence of moisture as noted above. Hence, this system should be kept essentially moisture-free at least unit it has been applied to the fabric. On the other hand, the presence of water can usually be tolerated in the pre-reacted system and the "blocked" isocyanate system may even be emulsified in water, if desired.

The polyurethane coating may be applied to the fabric using any convenient coating technique, for example, brushing, spraying or spreading. The thickness of the resulting coating prior to the caustic treatment or leach will usually fall in the range of 0.01 to 0.04 inch although it will be recognized that other coating thicknesses may be used depending on the circumstances, e.g. the type of fabric involved, etc.

The process described herein is applicable broadly to any type of textile fabric, woven or knitted, comprising natural and/or synthetic fibers which are not degraded by the caustic alkali treatment. Advantageously, the fabric comprises nylon or cotton or blends of these materials. Polyesters, e.g. polyethylene terephthalate, are degraded by caustic and should not be processed in the manner described herein. However, other materials such as rayon, acrylics and the like may be usefully treated in the manner and for the purpose described.

The invention is illustrated, but not limited, by the following example using a woven fabric comprising 100% nylon fibers in both the warp and weft. The fabric was made up of 166 warp ends per inch and 112 weft ends per inch and had a weight of 2.1 oz./sq. yard.

The above fabric was coated on both sides by spreading thereon a two component polyurethane-forming system (Bayer's Impranil CHW comprising polyester and polyisocyanate with catalyst dissolved in solvent, namely, ethyl acetate) followed by heating to remove the solvent and effect the desired reaction to polyurethane. Approximately 0.8 oz./yd.$^2$ of polyurethane was applied to each side of the fabric. The coating operation was performed by means of a knife over roll coater with drying at 100° C. The thus coated fabric was then immersed in boiling aqueous NaOH (10% by weight caustic) for 10 minutes. The fabric was then water washed for at least 15 minutes to remove hydrolyzed polyester and some of the caustic, followed by treatment in 10% acetic acid solution to neutralize the rest of the caustic, water washing and drying. A hydrostatic (Mullen) check of the fabric before the caustic treatment showed a water resistance of 140 p.s.i., and no degree of breathability. A hand scrub test of the untreated fabric would not allow any breathability. However, after the treatment in caustic, the fabric had an estimated breathability of 40 to 60 gms./hr./m.$^2$ and an estimated hydrostatic value between 4 and 10 p.s.i. Thus, the process of the present invention very signficantly improves the breathability of a polyurethane coating on textile fabric.

Various modifications may be made in the invention described herein. The possibility of treating other types of fabrics than those made up entirely of nylon has been mentioned. Additionally, in lieu of aqueous sodium hydroxide, aqueous potassium or lithium hydroxide may be used. Furthermore, other materials may be blended in with the polyurethane to improve certain characteristics. For example, polyvinyl chloride may be added to decrease surface tack while silicones may be included to improve resilience, hand and water-repellant properties. It has been found that these blended systems leach and perform in the same manner as the unblended polyurethane coatings.

In a further modification, loading agents or fillers, e.g. talc, kaolin, $TiO_2$, carbon black, or hydrated silica may be incorporated in the polyurethane coating to reduce the amount of time necessary for the leaching operation. The use of fillers aids in the absorption of the leach material and also appears to give a more even pore distribution. Apparently, the filler presents thinner film walls to the caustic and aids in the distribution of the bath throughout the coating itself to give the improved pore distribution. In this connection, it should be noted that the average pore size in products prepared according to the invention is usually in the order of 1 to 9 microns, the pores comprising around 10 to 50% of the total surface area of the coating.

Other modifications from the foregoing may also be made without deviating from the invention as defined in the following claims wherein:

We claim:

1. A process for preparing a breathable polyurethane coating on a textile fabric which comprises applying a polyurethane coating to at least one side of the fabric, immersing the coated fabric in hot aqueous caustic alkali and thereafter washing in water.

2. The process of claim 1 wherein the caustic alkali is at the boil.

3. The process of claim 1 wherein said fabric comprises a woven blend of nylon and cotton fibers.

4. The process of claim 1 wherein said fabric includes natural fibers.

5. The process of claim 1 wherein said fabric includes synthetic fibers.

6. The process of claim 1 wherein said fabric is water washed for at least 15 minutes, then neutralized with acetic acid, washed again and dried.

7. A process according to claim 1 wherein the polyurethane coating contains a filler.

8. A process according to claim 7 wherein the filler is selected from the group consisting of talc, kaolin, $TiO_2$, carbon black and hydrated silica.

9. A process for preparing a breathable polyurethane coating on a textile fabric which comprises applying a substantially continuous polyurethane coating to at least one side of the fabric, immersing and thereby leaching the coated fabric, in hot aqueous caustic alkali for about 5 to 9 minutes, water-washing the coated fabric at least 15 minutes and thereafter drying the coated fabric, whereby the said coated fabric is made permeable to air or water vapor by the formation of small pores comprising about 10 to 50% of the total surface area of the coating.

10. A process according to claim 9 wherein the said hot aqueous caustic alkali is a 4–12% solution of sodium hydroxide at its boiling temperature.

11. A product obtained by the process of claim 9 wherein the breathable polyurethane coating contains small pores, and the pore size being about 1–9 microns.

12. A process according to claim 10 where, after the said water-wash, the coated fabric is treated with acetic acid, whereby any remaining caustic alkali is neutralized, followed by a further water-washing before the said drying of the coated fabric.

References Cited

UNITED STATES PATENTS

| | | | |
|---|---|---|---|
| 2,657,151 | 10/1953 | Gensel et al. | 117—161 X |
| 2,721,811 | 10/1955 | Dacey et al. | 117—161 X |
| 2,848,752 | 8/1958 | Bechtold. | |
| 2,900,278 | 8/1959 | Powers et al. | 117—98 |
| 3,035,475 | 5/1962 | Rinke et al. | |
| 3,084,018 | 4/1963 | Whitfield et al. | 117—161 X |
| 3,100,721 | 8/1963 | Holden | 117—135.5 |
| 3,169,885 | 2/1965 | Golodner et al. | 117—135.5 |
| 3,180,853 | 4/1965 | Peters | 117—63 X |
| 3,190,766 | 6/1965 | Yuan | 117—63 |
| 3,222,208 | 4/1965 | Bertollo | 117—63 |
| 3,266,927 | 8/1966 | Lorenz et al. | 117—98 |

FOREIGN PATENTS

| | | |
|---|---|---|
| 207,835 | 4/1957 | Australia. |

WILLIAM D. MARTIN, *Primary Examiner.*

T. G. DAVIS, *Assistant Examiner.*